Sept. 16, 1924.

T. BOND

BANK CAGE

Original Filed Oct. 25, 1922

1,508,642

INVENTOR
THOMAS BOND.
By [signature]
Att'ys.

Patented Sept. 16, 1924.

1,508,642

UNITED STATES PATENT OFFICE.

THOMAS BOND, OF BRANTFORD, ONTARIO, CANADA.

BANK CAGE.

Application filed October 25, 1922, Serial No. 596,849. Renewed July 23, 1924.

*To all whom it may concern:*

Be it known that I, THOMAS BOND, a subject of the King of Great Britain, and a resident of the city of Brantford, in the county of Brant, in the Province of Ontario, Canada, have invented certain new and useful Improvements in Bank Cages, of which the following is the specification.

My invention relates to improvements in bank cages and the object of the invention is to devise manually operated means for releasing a shutter which will cover the front of the cage above the counter and thus protect the occupant of the cage from being held up by bank robbers.

A further object is to devise means whereby the raising of the shutter will automatically release bullet proof side curtains which will cover the sides of the cage above the counter and thus prevent the occupant from being shot at from an angle by an aimed shot.

A still further object is to devise spring means for actuating the shutter into the operative position and another object is to devise means for restoring the shutter to its initial position below the counter of the cage.

My invention consists of a bank cage constructed and arranged all as hereinafter more particularly described and illustrated in the accompanying drawing in which.

Like characters of reference indicate corresponding parts in the different views.

Figure 1:
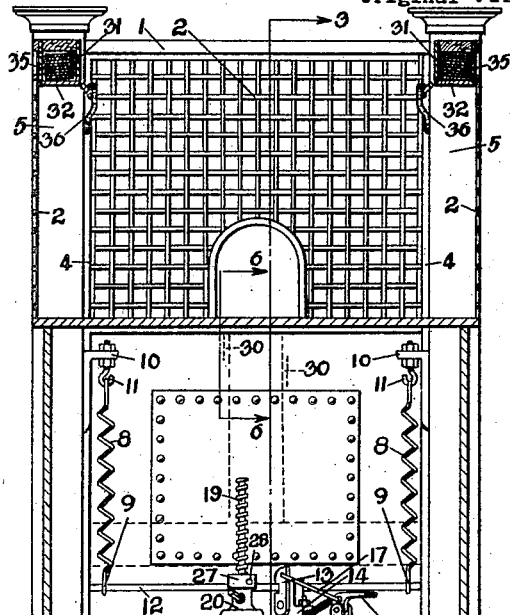
Fig. 1 represents a vertical cross sectional view of the cage through the line 1—1 Figure 3, showing the shutter in the inoperative position.

1 is the cage provided with the usual grids 2 at front and sides 3 is the shutter constructed of bullet resisting material adapted to slide vertically on the tracks 4 secured to the inner face of the side posts 5 of the cage, said shutter adapted to extend through a slot 6 in the counter 7.

8 are depending springs having hooked lower ends 9, said springs being suitably secured at their upper ends to the brackets 10 mounted on the posts 5, such as by the hooks 11.

12 is the bottom bar of the shutter. 13 is a hook shaped catch adapted to engage the bottom bar 12 of the shutter and pivotally mounted on the block 14 positioned on the floor of the cage. 15 is a pedal pivotally mounted in the bearing 16 and 17 is a rod pivotally connected at its rear end to the pedal 15 and at its forward end to the catch 13 in the vicinity of its free end. 18 is a spring extending between the pedal 15 and the block 14 for normally holding the catch assembly in its engaged position.

19 is a vertically disposed worm rotatably mounted in the housing 20 situated on the floor of the cage, said worm carrying the bevelled gear 21 adapted to mesh with the bevelled gear 22 on an operating spindle 23, rotatably mounted in the housing, said spindle having a squared upper end 24 which is inserted into the socket portion 25 of the handle 26.

Figure 4:
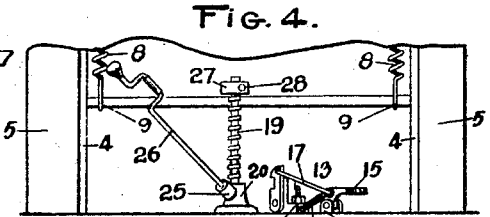
Fig. 4 is a similar view to Figure 2 showing the lower portion of the front of the cage viewed from the interior thereof and the means for restoring the shutter to the initial or inoperative position.
Figures 5, 6, 7:
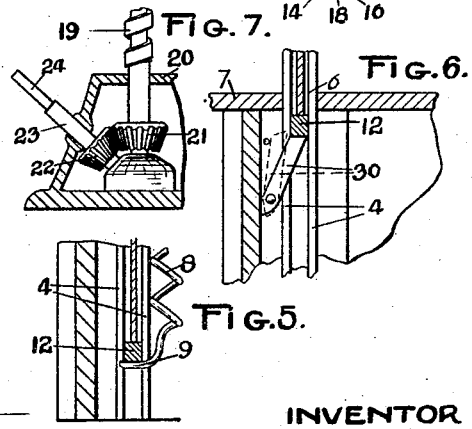
Fig. 5 is a cross sectional view showing the connection between the springs and the bottom of the shutter.
Fig. 6 is a vertical cross section through the line 6—6 Figure 1, showing the means for locking the shutter in the up position.
Fig. 7 is an enlarged vertical sectional detail of the worm rotating means.

27 is an internally threaded block screwed onto the worm 19. 28 is a pin extending freely through the block 27 and adapted to be inserted into the hole 29 in the shutter when such shutter is in the position illustrated in Figure 4.

30 are catches pivotally mounted on the inside front of the cage and having their free ends adapted to engage the bottom bar 12 of the shutter when such shutter is moved up into the operative position.

31 are side curtain housings provided with the hinged bottoms 32 normally held in the closed position by pivotally mounted hook catches 33 engaging pins 34 on such hinged bottoms. Collapsible side curtains 35 of bullet proof material are secured at their tops in the housings 31 and when in the operative position adapted to extend down and cover the sides of the cage. When in the inoperative position they are folded up into the housings 31 as illustrated in Figure 1 of the drawing. Levers 36 are pivotally connected to the rear faces of the corner posts 5 and 37 are rods, each pivotally connected at one end to the free end of the corresponding lever 36 and at the other end to the corresponding catch 33 intermediately of the length of the same.

My device operates as follows:

In the inoperative position illustrated in Figure 1 the shutter is entirely concealed below the counter 7 and in this position the springs 8 which hook over the bottom bar 12 are distended, the shutter being held in such position by means of the catch 13 engaging the bottom bar. The side curtains are also in the inoperative position illustrated in Figure 1.

On desiring to throw the shutter 3 and the side curtains 35 into the operative or closed position it is only necessary for the occupant of the cage to step on the pedal 15, which through the medium of the rod 17 will actuate the catch 13 and disengage it from the bar 12, thus allowing the shutter to be pushed up under the influence of the force exerted by the distended springs. When the shutter reaches its uppermost or closed position illustrated in Figure 2 it will be prevented from falling back into the inoperative position by catches 30, two being provided as a precautionary measure. In the event of the upper one failing, the lower one will engage the shutter.

Figure 2:
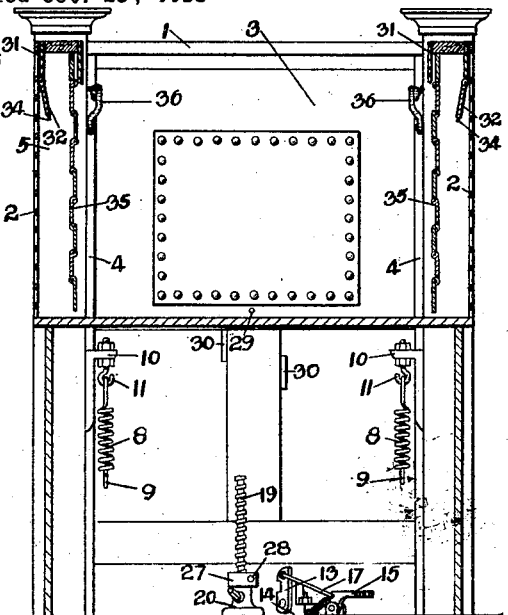
Fig. 2 is a similar view to Figure 1 showing the shutter in the operative position.
Figure 3:
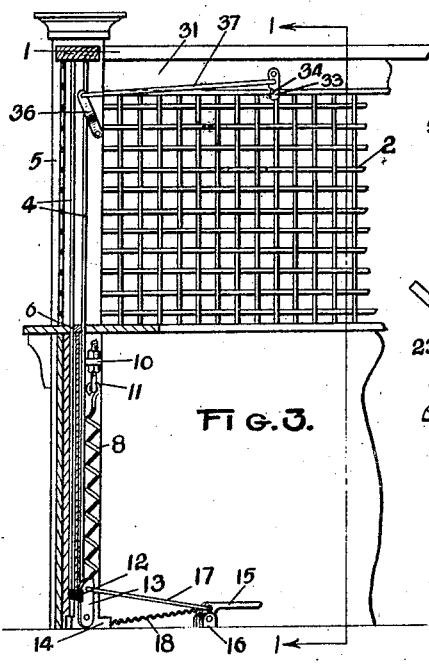
Fig. 3 is a vertical cross sectional view through the line 3—3 Figure 1.

As the shutter moves up to the closed position it will engage the levers 36, move them inwardly and thus through the medium of the rods 37 actuate the catches 33 and release them from engagement with the pins 34 whereby the hinged bottoms 32 of the housings 31 will fall into the position illustrated in Figure 2 and the side curtains will then fall into their operative position, as illustrated in that figure.

When it is desired to restore the shutter to its inoperative position the catches 30 are pressed forwardly, thus allowing the shutter to fall onto the hooks 9 of the springs 8 which will support it. The block 27 is then moved up the worm 19 until the pin 28 therein registers with the hole 29 in the shutter when such pin is inserted thereinto, and by rotating the worm 19 through the medium of the gears 21 and 22 and spindle 23 which is operated by the handle 26, the shutter will be drawn down until the bottom bar 12 again engages the catch 13.

The side curtains are folded up into the housings 31 and the bottom bars turned up into their closed position wherein they will be engaged by the catches 33.

From the above description it will be seen that I have devised a simple and effective bank cage which will protect the occupant from being held up or shot at by aimed shots by persons outside the cage and which can be operated instantaneously.

What I claim as my invention is:

1. In a bank cage, the combination with the front thereof, of a vertically slidable bullet proof shutter, means for pulling the shutter down into its inoperative position, a tension spring secured at its upper end to the cage and its lower end provided with a hook adapted to engage the bottom edge of the shutter upon its being moved down into the inoperative position whereby such spring is distended, releasable means for normally holding the shutter in the inoperative position, and a pivotally mounted catch on the cage normally held by the shutter in its inoperative position upon such shutter being in the down position, the free end of said catch swinging rearwardly and engaging the bottom of the shutter upon the latter being thrown upwardly into its fully closed position.

2. In a bank cage, the combination with the front thereof, of a vertically slidable bullet proof shutter, means for pulling the shutter down into its inoperative position, a tension spring secured at its upper end to the cage and its lower end provided with a hook adapted to engage the bottom edge of the shutter upon its being moved down into the inoperative position whereby such spring is distended, a vertical rotatable spindle journalled on the floor of the cage in rear of the shutter, a worm block thereon having a hole therethrough, a hole in the shutter, a removable pin insertable through the two holes, means for rotating the spindle, and releasable means for holding up the shutter in the closed position upon its being thrown into such position by the spring, the hook on the spring being detached from the bottom edge of the shutter upon the latter being thrown upwardly thereby.

3. In a bank cage, the combination with the front thereof, of a vertically slidable bullet proof shutter, means for pulling the shutter down into its inoperative position, a tension spring secured at its upper end to the cage and its lower end provided with a hook adapted to engage the bottom edge of the shutter upon its being moved down into the inoperative position whereby such spring is distended, a vertical rotatable spindle journalled on the floor of the cage in rear of the shutter, a worm block thereon having a hole therethrough, a hole in the shutter, a removable pin insertable through the two holes, means for rotating the spindle, and a pivotally mounted catch on the cage normally held by the shutter in its inoperative position upon such shutter being in the down position, the free end of said catch swinging rearwardly and engaging the bottom of the shutter upon the latter being thrown upwardly into its fully closed position.

4. In a bank cage, the combination with the front and sides thereof, a vertically slidable shutter, means for throwing the shutter up into the closed position covering the exposed front of the cage, collapsible bullet proof side curtains normally retained in their collapsed position, and means engaged by the shutter upon its being thrown up into the closed position whereby the side curtains are released and drop into their closed position covering the exposed sides of the cage.

5. In a bank cage, the combination with a vertically slidable bullet proof shutter, of side curtain housings having hinged bottoms, bullet proof side curtains normally collapsed up into the housings and retained therein by the hinged bottoms, and means actuated by the shutter upon its moving up into the closed position for automatically permitting the opening of the hinged bottoms of the housings to release the side curtains.

6. In a bank cage, the conbination with a vertically slidable bullet proof shutter, of side curtain housings having hinged bottoms, bullet proof side curtains normally collapsed up into the housings and retained therein by the hinged bottoms, catches engaging the hinged bottoms, pivotally connected levers operated by the shutter coming in contact therewith, and rods pivotally connected to the levers and catches.

THOMAS BOND.